United States Patent
Smith

(10) Patent No.: US 8,553,686 B2
(45) Date of Patent: Oct. 8, 2013

(54) PERFORMING ACTIONS ON FRAME ENTRIES IN RESPONSE TO RECEIVING BULK INSTRUCTION

(75) Inventor: Brandon Carl Smith, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 737 days.

(21) Appl. No.: 12/769,369

(22) Filed: Apr. 28, 2010

(65) Prior Publication Data

US 2011/0271082 A1 Nov. 3, 2011

(51) Int. Cl.
*H04L 12/56* (2011.01)
(52) U.S. Cl.
USPC .......................................................... 370/389
(58) Field of Classification Search
None
See application file for complete search history.

(56) References Cited

U.S. PATENT DOCUMENTS

| | | | | |
|---|---|---|---|---|
| 5,909,686 A * | 6/1999 | Muller et al. | | 370/392 |
| 6,147,976 A * | 11/2000 | Shand et al. | | 370/254 |
| 7,120,144 B1 * | 10/2006 | Parekh et al. | | 370/389 |
| 7,333,490 B2 * | 2/2008 | Henderson et al. | | 370/392 |
| 8,358,654 B1 * | 1/2013 | Krivitski | | 370/392 |
| 2002/0163913 A1 * | 11/2002 | Oh | | 370/392 |
| 2008/0222486 A1 * | 9/2008 | Richardson et al. | | 714/757 |

* cited by examiner

*Primary Examiner* — Anh-Vu Ly
(74) *Attorney, Agent, or Firm* — McDermott Will & Emery LLP

(57) ABSTRACT

Various example embodiments are disclosed. According to an example embodiment, a switch may comprise an instruction decode stage and a lookup stage. The instruction decode stage may be configured to receive a bulk instruction identifying an action to perform on frame entries of the lookup stage, and in response to receiving the bulk instruction, send, to the lookup stage, at least first and second frame entry instructions, each of the first and second frame entry instructions identifying the action and identifying a unique frame entry in the lookup stage upon which to perform the action. The lookup stage may be configured to receive the first and second frame entry instructions from the instruction decode stage, and in response to receiving each of the first and second frame entry instructions, perform the identified action on the frame entry identified by the respective frame entry instruction.

20 Claims, 4 Drawing Sheets

Method 900

| 0000 | 111111 | 00000000 | 0 |

Match Mask
314

|  | 000001 |  |  |

Match Data
316

| 0000 | 000000 | 11111111 | 0 |

Replace Mask
320

|  |  | 00000100 |  |

Replace Data
322

PERFORMING ACTIONS ON FRAME ENTRIES IN RESPONSE TO RECEIVING BULK INSTRUCTION

TECHNICAL FIELD

This description relates to network switches.

BACKGROUND

Network switches may receive and forward frames. The switches may store information related to the received and forwarded frames, such as, for example, the source address, virtual network or other identifier, or a port via which the frames were received. Over time, the switches may receive instructions to modify or delete some of the stored information. In particular, the switches may receive instructions to modify or delete relatively large subsets of the stored information which share one or more common features (e.g., a common source address). It may be difficult to execute such modifications or deletions in a fast and efficient manner.

SUMMARY

The details of one or more implementations are set forth in the accompanying drawings and the description below. Other features will be apparent from the description and drawings, and from the claims.

DETAILED DESCRIPTION

Figure 1:
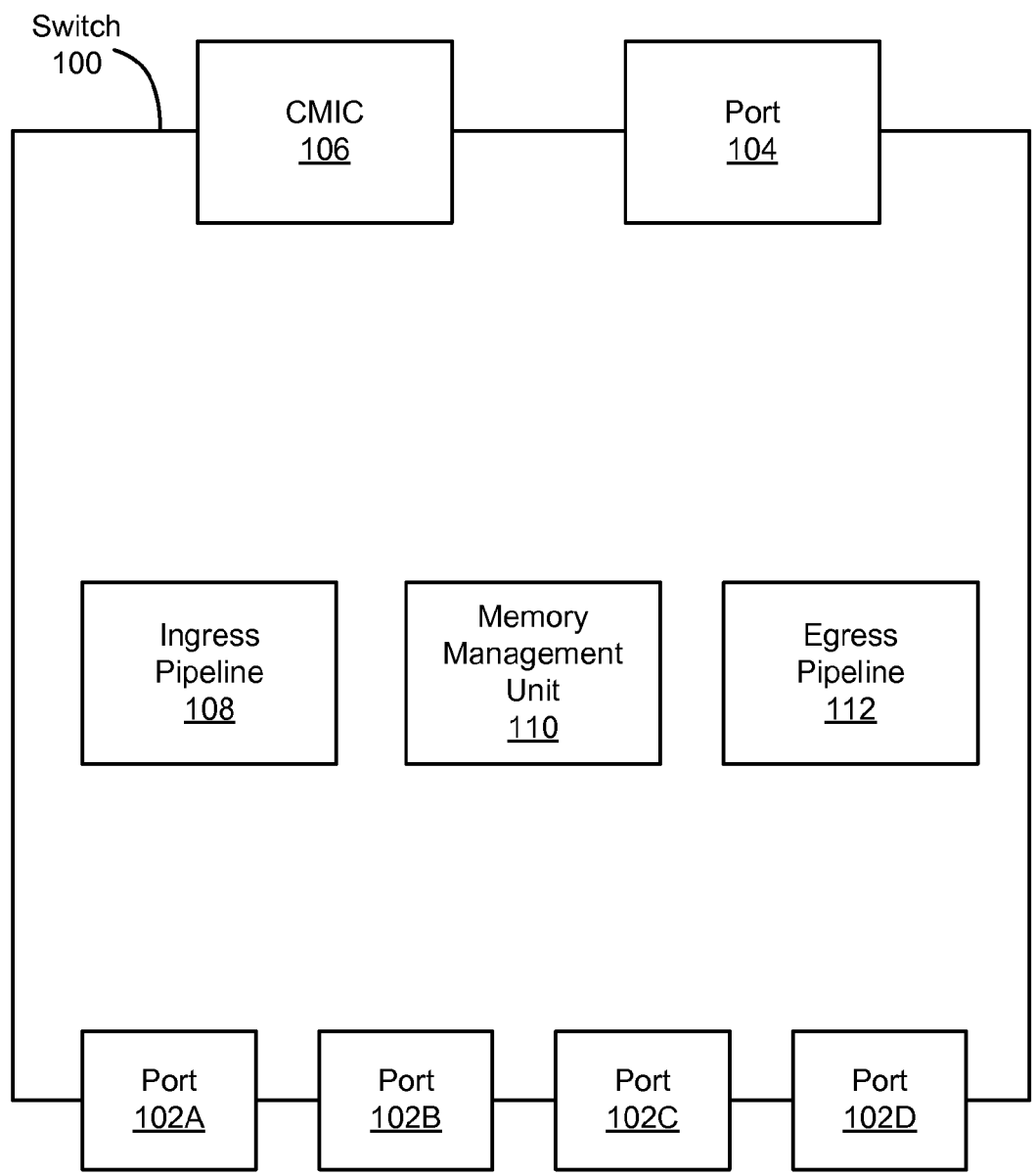
FIG. 1 is a block diagram of a switch according to an example embodiment.

FIG. 1 is a block diagram of a switch 100 according to an example embodiment. While the term, "switch," is used herein, the switch 100 may include a router or any other computing device designed to receive frames, packets or other messages from computing devices and forward or route the frames, packets, or other messages to other computing devices. The switch 100 may include, by way of example, an IEEE 802.3 Ethernet switch, an IEEE 802.11 WLAN Access Point, an IEEE 802.16 Worldwide Inoperability for Microwave Access (WiMAX) base station, or any other computing device configured to receive frames, packets, or messages from computing devices and forward them to other computing devices. While the term, "frame," is used herein with reference to layer 2 (L2) communication protocols such as medium access control (MAC) communication protocols, the devices and techniques described herein may be applicable to other communication protocols, and this disclosure is not limited to L2 or MAC protocols.

The switch 100 may receive frames and forward the frames. The switch 100 may, for example, receive frames from one computing device and forward them to another computing device. The switch 100 may forward the frames based on, e.g., a destination address included in the frames.

In an example embodiment, the switch 100 may include a plurality of ports 102A, 102B, 102C, 102D, 104. The ports 102A, 102B, 102C, 102D, 104 may be configured to both receive and send frames, or some of the ports may be configured to only receive frames and some of the ports may be configured to only send frames, according to example embodiments.

In an example embodiment, the ports 102A, 102B, 102C, 102D, 104 may have different communication speeds. For example, the ports 102A, 102B, 102C, 102D may be one gigabit ports capable of communicating at a rate of one gigabit per second, such as by transmitting and/or receiving data at a rate of one gigabit per second, and the port 104 may be a 10 gigabit port capable of transmitting and/or receiving data at a rate of 10 gigabits per second. While four ports 102A, 102B, 102C, 102D are shown in FIG. 1, this is merely an example. Any number of ports 102A, 102B, 102C, 102D, 104 may be included in the switch 100. For example, eight one gigabit ports 102A, 102B, 102C, 102D may be included along with one 10 gigabit port 104, or any number of ports 102A, 102B, 102C, 102D, 104 of any speed may be included.

The ports 102A, 102B, 102C, 102D, 104 may be coupled to a plurality of computing devices (not shown). The ports 102A, 102B, 102C, 102D, 104 may each be coupled to a single computing device and capable of receiving and sending data from and to the single computing device to which the port 102A, 102B, 102C, 102D, 104 is coupled, according to an example embodiment. In another example embodiment, any or all of the ports 102A, 102B, 102C, 102D, 104 may be coupled to more than one computing device. In such latter example, the ports 102A, 102B, 102C, 102D, 104 may engage in medium access control (MAC) protocols to ensure that the ports 102A, 102B, 102C, 102D, 104 are communicating with only one of the computing devices to which they are coupled at any given time.

The ports 102A, 102B, 102C, 102D, 104 may receive frames from the computing devices and send the frames to a computing device to which the frames are destined. A destination address may be included in the frames to facilitate sending the frames to the correct computing device. The switch 100 may send the frames to the destined computing device by sending the frames back out of one of the ports 102A, 102B, 102C, 102D, 104. The switch 100 may, for example, associate a destination address, which may be a MAC address, an internet protocol (IP) address, or any other address, with one of the ports 102A, 102B, 102C, 102D, 104. The switch 100 may, for example, map the address of the destination address of the received frame to one of the ports 102A, 102B, 102C, 102D, 104 and send the received frame out of the port 102A, 102B, 102C, 102D, 104 to which the destination address is mapped.

The switch 100 may also include a CPU management interface controller (CMIC) 106. The CMIC 106 may, for example, serve as an interface between the switch 100 and a software controller or CPU. The CMIC 106 may, for example, receive commands, such as bulk software commands, from the software or CPU which may be associated with the controlling computer, and the CMIC 106 and/or switch 100 may perform actions based on the received commands. The CMIC 106 may, for example, receive commands from the software to age entries on tables or to record actions performed within the switch 100. The CMIC 106 may translate instructions from the software to a format understood by the switch 100. The CMIC 106 may also, for example, provide information to the software, such as when the action instructed by the software has been completed by the switch 100.

The switch 100 may also include an ingress pipeline 108. The ingress pipeline 108, which is shown in greater detail in FIG. 3, may receive the frames received by the switch 100 via the ports 102A, 102B, 102C, 102D, 104. For example, the ports 102A, 102B, 102C, 102D, 104 may, upon receiving the frames, send the frames to the ingress pipeline 108. The ingress pipeline 108 may "learn" the received frames. The ingress pipeline 108 may learn the received frames by, for example, recording data or information on frame entries of a frame entry table, or a lookup table, based on the received frames. In an example embodiment, the frame entry table or lookup table may include a plurality of frame entries, each of the frame entries including a single MAC address and information associated with that MAC address.

For example, the ingress pipeline 108 may, upon receiving a frame, record the port 102A, 102B, 102C, 102D, 104 via which the frame was received, the source address of the frame, and a virtual identifier or a virtual local area network (LAN) of the received frame. The ingress pipeline 108 may record and/or associate the source address of the received frame with the port 102A, 102B, 102C, 102D, 104 via which the frame was received.

Associating the source address of the received frame with the port 102A, 102B, 102C, 102D, 104 via which the frame was received may allow the ingress pipeline and/or other blocks within the switch 100 to map addresses of frames to ports 102A, 102B, 102C, 102D, 104. For example, if the ingress pipeline 108 has associated a given source address of a frame with the port 102A, 102B, 102C, 102D, 104 via which the frame was received, the switch 100 may also associate that same port 102A, 102B, 102C, 102D, 104 with a destination address of a subsequent frame. If the ingress pipeline 108 has associated a port 102A, 102B, 102C, 102D, 104 with the source address of a received frame, then if the switch 100 needs to send a subsequent frame to a destination address which matches a source address of a previously learned frame, then the switch 100 may send the frame through the port 102A, 102B, 102C, 102D, 104 which was previously associated with the frame which had a source address matching the destination address of the current frame.

The ingress pipeline 108 may, upon receiving the frames, check to determine whether the frames match frame entries which have already been learned. For example, if the ingress pipeline 108 has already recorded, on a frame entry of a frame entry table or lookup table, the MAC address, virtual identifier, and port of a frame, and another frame is received with the same MAC address, virtual identifier, and port, then the ingress pipeline may not need to learn the new frame, and may not add a new entry based on the new frame. The ingress pipeline 108 may, after learning and/or looking up the received frame, forward the frame to a memory management unit 110.

In an example embodiment, the ingress pipeline 108 may age certain frame entries. The ingress pipeline 108 may, for example, track how recently a frame entry has been used and/or whether a frame entry has been used within a given time interval. For example, the ingress pipeline 108 may, upon receiving a frame, note that an associated frame entry (which stores data associated with the received frame) has been used. Upon predetermined time intervals, the ingress pipeline 108 may check each of the frame entries, and if it is not noted to have been used within the previous time interval, the frame entry may be erased. If the frame entry is noted to have been used within the preceding time interval, such as by the switch 100 and/or ingress pipeline 108 receiving a frame with an address matching the address of the frame, then the note of the use of the frame entry during the preceding time interval may be erased and/or set to zero. During the next time aging interval, if the frame entry has not been used again (which would be noted in the frame entry) and/or if the frame entry note of use has been set to zero, then the frame entry may be erased.

The memory management unit 110 may be included in the switch 100. The memory management unit 110 may store frames received by the switch 100. The memory management unit 110 may receive frames which are sent by the ingress pipeline. The ingress pipeline 108 may, for example, push received frames to the memory management unit 110. The memory management unit 110 may store the received frames until an egress pipeline 112 is ready to forward the frames out of the switch 100 via one or more of the ports 102A, 102B, 102C, 102D, 104.

The switch 100 may also include the egress pipeline 112. The egress pipeline 112 may receive frames from the memory management unit 110. The memory management unit 110 may act as a storage unit for providing frames to the egress pipeline 112 upon request from the egress pipeline 112. The memory management unit 110 may provide the frames to the egress pipeline 112 upon request from the egress pipeline 112. The egress pipeline 112 may pull frames from the memory management unit 110, such as by sending a "ready" message to the memory management unit 110, prompting the memory management unit 110 to send the frames to the egress pipeline 112. The egress pipeline 112 may, for example, pull the frames from the memory management unit 110 based on flow control considerations, such as whether the receiving computing device is ready to receive more frames and/or has acknowledged previously-sent frames.

The egress pipeline 112 may send the frames out of the switch 100 via one or more of the ports 102A, 102B, 102C, 102D, 104. The egress pipeline 112 may send the frame out of a port 102A, 102B, 102C, 102D, 104 indicated by the ingress pipeline 108. For example, when the ingress pipeline 108 sends the frame to the memory management unit 110, the ingress pipeline 108 may add a port number to the frame based on the port associated with the destination address.

Figure 2:
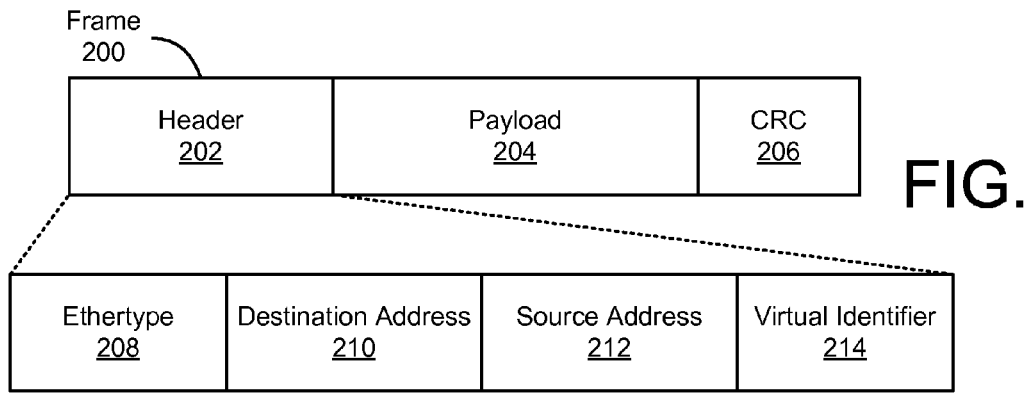
FIG. 2 is a block diagram of a frame received by the switch according to an example embodiment.

FIG. 2 is a block diagram of a frame 200 received and/or forwarded by the switch 100 according to example embodiment. The frame 200 may be an example of a frame received by the switch 100 and/or forwarded by the switch 100. The format of the frame 200 with fields shown in FIG. 2 is merely exemplary. Frame 200 with many other frame formats may be received and forwarded by the switch 100.

In the example shown in FIG. 2, the frame 200 may include a header 202. The header 202 may include, for example, an ethertype subfield 208. The ethertype subfield 208 may indicate a communication protocol of the frame 200. For example, the ethertype subfield 208 may indicate an Ethernet protocol, such as Gigabit Ethernet or 10 Gigabit Ethernet, according to which the frame 200 was sent. The header 202 may also include a destination address subfield 210. The destination address subfield 210 may include an address of a computing device to which the frame 200 is to be sent and/or is destined. The destination address subfield 210 may include, for example, a MAC address, IP address, or other address of the computing device to which the frame 200 is to be sent. The header field 202 may also include a source address subfield 212. The source address subfield 212 may include an address of a computing device which sent the frame 200 to the switch 100. The source address subfield 212 may include, for example, a MAC address, an IP address, or other address of the computing device from which the frame 200 was sent. The header field 202 may also include a virtual identifier subfield 214. The virtual identifier subfield 214 may indicate a virtual network of which the computing device which sent the frame 200 is a member. The virtual identifier subfield 214 may, for example, indicate a virtual local area network (VLAN) of which the computing device which sent the frame 200 is a member. The header field 202 may include more or fewer subfields than those shown in FIG. 2, according to various example embodiments.

The frame 200 may also include a payload field 204. The payload field 204 may include data which is included in the frame 200. The payload field 204 may also include addressing information according to higher layer protocols, such as a layer 3 IP protocol and/or other networking protocols. The frame 200 may also include a cyclic redundancy code (CRC) field 206. The CRC field 206 may, for example, include data and/or bits which the switch and/or ports 102A, 102B, 102C, 102D, 104 may use to confirm that the data and/or bits in the frame 200 were correctly received. The switch 100 and/or ports 102A, 102B, 102C, 102D, 104 may, for example, check the data and/or bits included in the frame against the data and/or bits included in the CRC field 206 and/or a previously known code to determine whether the frame 200 was correctly received.

Figure 3:
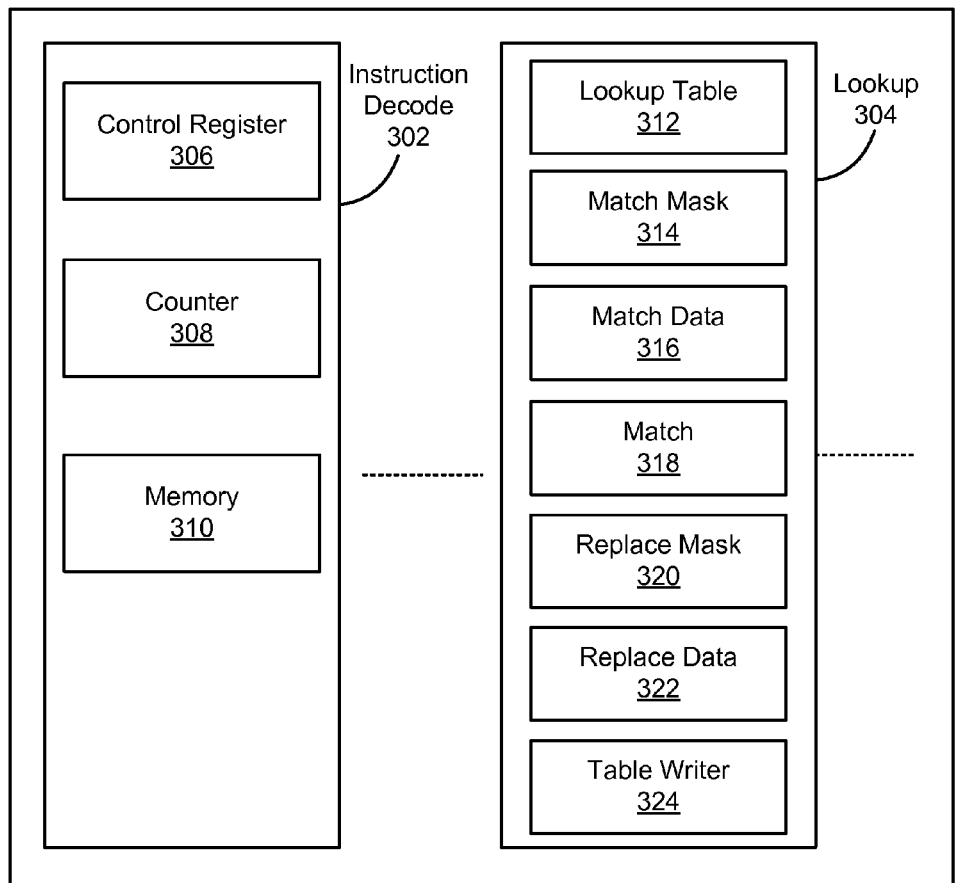
FIG. 3 is a block diagram of an ingress pipeline included in the switch according to an example embodiment.

FIG. 3 is a block diagram of the ingress pipeline 108 included in the switch 100 according to an example embodiment. In this example, the ingress pipeline may include an instruction decode stage 302 and a lookup stage 304. The instruction decode stage may, for example, receive, decode and/or send instructions to the lookup stage 304. The instruction decode stage 302 may, for example, send instructions to the lookup stage 304 to modify frame entries and/or perform other actions. In an example embodiment, the instruction decode stage 302 may receive instructions from software and/or CPU via the CMIC 106. The instruction decode stage 302 may, for example, receive a bulk instruction from the software and/or CPU via the CMIC 106.

The bulk instruction may be an instruction for the ingress pipeline 108 and/or switch 100 to perform actions on a plurality of frame entries included in the ingress pipeline 108. The bulk instruction may, for example, be a single instruction to which the instruction decode stage 302 responds by providing a plurality of instructions to the lookup stage 304. The bulk instruction may be a single message from the software and/or CPU, and/or may be composed of multiple messages which, individually, would not be an instruction to which the ingress pipeline 108 and/or switch 100 would respond by performing an action, but which, together, make up an instruction to which the ingress pipeline 108 and/or switch 100 will respond by performing one or more actions.

In an example embodiment, the bulk instruction may identify an action which the lookup stage 304 should perform on a plurality of frame entries, but the bulk instruction may not identify any of the frame entries. In this example, the instruction decode stage may receive the single bulk instruction and send, in response to receiving the bulk instruction, a plurality of frame entry instructions to the lookup stage 304. The bulk instruction may, for example, identify the action to perform on frame entries independently of identifying any of the frame entries, and/or may identify the action to perform on frame entries without identifying any of the frame entries.

The instruction decode stage 302 may, for example, send a number of frame entry instructions to the lookup stage 304 based on (or equal to) the number of frame entries included in the lookup stage 304 of the ingress pipeline 108 of the switch 100, or the instruction decode stage 302 may respond to receiving the bulk instruction by sending a number of frame entry instructions to the lookup stage 304 equal to twice the number of frame entries included in the lookup stage 304. In an example embodiment, the instruction decode stage 302 may send the frame entry instructions to the lookup stage 304, and the frame entry instructions may each identify the action and identify a unique frame entry in the lookup stage 304 upon which to perform the action.

The instruction decode stage 302 may, for example, send consecutive frame entry instructions to the lookup stage with consecutive frame entry identifiers and/or frame entry numbers, or if the instruction decode stage 302 sends a number of frame entry instructions to the lookup stage 304 equal to twice the number of frame entries included in the lookup stage 304, the instruction decode stage 302 may send pairs of frame entry instructions to the lookup stage 304 with a same unique frame entry number or identifier and consecutive pairs may have consecutive numbers. In an example embodiment, all of the frame entry instructions sent by the instruction decode stage 302 to the lookup stage 304 and/or the pairs of frame entry instructions sent by the instruction decode stage 302 to the lookup stage 304 may have consecutive frame entry numbers and/or all of the frame entries or frame entry pairs may correspond to all of the frame entry numbers of the frame entries in the lookup stage 304.

In an example embodiment, the instruction decode stage 302, ingress pipeline 108, and/or switch 100 may respond to the bulk instruction by performing a loop function. The loop function may include a number of iterations based on (or equal to) the number of frame entries included in the lookup stage 304, in the ingress pipeline 108, and/or in the switch 100. During each iteration, the instruction decode stage 302 may send a frame entry instruction, or pair of frame entry instructions including a match instruction and an action instruction, to the lookup stage 304. During each iteration, the frame entry instruction (or pair of frame entry instructions) may include the identified action (or match instruction followed by the action instruction). During each iteration, the frame entry instruction or pair of frame entry instructions may identify the frame entry upon which the action is to be performed. The identified frame entry may be based on the iteration number of the loop function. For example, the loop function may perform as the following code:

```
for (i = 0; i < numberOfFrameEntries; i++) {
    SendFrameEntryInstructionIdentifyingFrameEntry(i);
}
    or
for (i = 0; i < numberOfFrameEntries; i++) {
    SendMatchInstructionIdentifyingFrameEntry(i);
    SendActionInstructionIdentifyingFrameEntry(i);
}
``` with i being passed to the lookup stage 304 as the frame entry identifier. While this code shows how the loop function could be implemented in a general-purpose microprocessor, the loop function may also be implemented in hardware, such as in an application-specific integrated circuit (ASIC) of the ingress pipeline 108, according to example embodiments.

In an example embodiment, the lookup stage 304 may respond to receiving the frame entry instructions by performing the actions identified in the frame entry instructions on the frame entries identified by the respective instructions. In example embodiments, the bulk instructions may include replace instructions, delete instructions, and/or age instructions independently of and/or without identifying the frame entries, and the corresponding frame entry instructions may also include replace instructions, delete instructions and/or age instructions while also identifying the frame entry upon which the action is to be performed. In an example embodiment, a replace instruction may instruct the lookup stage 304 to replace at least a portion of an identified frame entry with data including in the replace instruction. In an example embodiment, a delete instruction may instruct the lookup stage 304 to delete at least a potion of an identified frame entry. In an example embodiment, an age instruction may instruct a lookup stage 304 to age an identified frame entry, which may result in the frame entry having its hit bit or field set to zero if it was previously one, or deleting the frame entry if the hit bit or field was previously zero, as discussed above in paragraph [0024].

The aging instruction may perform the same function on selected frame entries that the aging function typically performs at each aging interval, except that the aging function performs this action within the aging interval. Thus, the aging function may cause a frame entry to be erased and/or deleted if it is noted to have been used within the preceding time interval and/or may erase the frame entry if it is not noted to have been used within the preceding time interval.

The instruction decode stage 302 may include a control register 306. The control register 306 may include a plurality of fields, such as a start field, a complete field, an action field, and/or an L2_MOD_FIFO_RECORD. The table below shows these four fields according to an example embodiment.

The instruction decode stage 302 may also respond to receiving the bulk instruction by setting a start bit in the control register 306. The instruction decode stage 302 may respond to the start bit being set by sending the frame entry instructions to the lookup stage 304. The software and/or CPU may read the complete bit via the CMIC 106. The instruction decode stage 302 may set the complete bit to zero (0) in response to the ingress pipeline 108 receiving the bulk instruction. The instruction decode stage 302 may set the complete bit within the control register 306 to one (1) after the instruction decode stage 302 has sent all of the frame entry instructions to the lookup stage 304. The software and/or CPU may read the complete bit, and, upon reading a one (1) in the complete bit, determine that the action included in the bulk instruction has been performed, according to an example embodiment.

The instruction decode stage 302 may also set an L2_MOD_FIFO_RECORD bit based on the bulk instruction and/or based on receiving a record FIFO instruction from the software and/or CPU via the CMIC 106. The ingress pipeline 108 may record actions performed on frame entries based on whether the L2_MOD_FIFO_RECORD is set or not. In an example embodiment, if the L2_MOD_FIFO_RECORD is set, then the ingress pipeline 108 may record and/or push all actions performed on frame entries onto a stack. The software and/or CPU may pop these entries off the stack to determine what actions have been performed on frame entries. If the L2_MOD_FIFO_RECORD entry or bit is not set, then the ingress pipeline 108 may not record and/or push actions performed on the frame entries onto the stack, according to an example embodiment.

The instruction decode stage 302 may also include a counter 308. The counter 308 may be a register and/or may be

| Field Name | Bits | Description |
|---|---|---|
| COMPLETE | 1 | L2_BULK operation is complete |
| START | 1 | Initiate the L2_BULK operation |
| ACTION | 2 | 0 - No Action<br>1 - Delete entry<br>2 - Replace entry using data from L2_BULK_REPLACE_EN and L2_BULK_REPLACE_DATA<br>3 - Perform age action on entry. |
| L2_MOD_FIFO_RECORD | 1 | 0 - Do not record entry to L2_MOD_FIFO<br>1 - Record entry to L2_MOD_FIFO |

In this example, the action field may store the type of action the bulk instruction has instructed the ingress pipeline 108 to perform. In an example embodiment, upon receipt of a bulk instruction from the software via the CMIC 106, the instruction decode stage 302 may set the action field to store the type of instruction the bulk instruction is instructing the ingress pipeline 108 to perform. The action field may indicate, for example, no action, a delete entry such as to delete at least a portion of some identified frame entries, a replace entry to delete at least a portion of some identified frame entries, and/or age instructing the ingress pipeline 108 to age some of the frame entries. The frame entries upon which the actions are to be performed may not be included in the bulk instruction or stored in the instruction decode stage 302, but may be determined by the lookup stage 304 based on a match mask field included in the bulk instruction and passed to a match mask register included in the lookup stage 304, and/or based on a match data field included in the bulk instruction and passed to a match data register included in the lookup stage 304, according to an example embodiment.

a portion of a memory included in the instruction decode stage 302. The counter 308 may store the frame entry number for which the frame entry instructions are to be set. In an example embodiment, the instruction decode stage 302 may increment the counter 308 after each frame entry instruction and/or each pair of frame entry instructions are sent to the lookup stage. The counter 308 may, for example, store the value of 'i' in the for loop example described in paragraph [0036]. The frame entry instructions sent by the instruction decode stage 302 to the lookup stage 304 may include a field indicating the frame entry upon which the frame entry instruction is to be performed, which may be the frame entry number indicated by the counter 308 according to an example embodiment.

The instruction decode stage may also include a memory 310. The memory 310 may, for example, store data on behalf of the instruction decode stage 302. The memory 310 may, for example, record and/or store the frames and/or data included in the bulk instructions. The memory 310 may, for example, store information which will be included in the frame entry instructions such as data used to identify which frame entries will have actions performed on them and/or which fields within the frame entries will be changed and what changes will be made to those fields, all according to an example embodiment. The data used to identify the frame entries and/or the fields within the frame entries to be changed and the changes themselves may be included in a match mask, match data, replace mask, and replace data, as described below, according to an example embodiment.

While the ingress pipeline 108 shown in FIG. 3 includes only two stages, namely the instruction decode stage 302 and the lookup stage 304, other stages may be included in the ingress pipeline 108. For example, stages may be included which facilitate the instructions being sent from the instruction decode stage 302 to the lookup stage 304. Also, while the lookup stage 304, as discussed herein, relates to layer 2 and/or MAC operations, lookup stages for higher layer operations such as level 3 or Internet Protocol (IP) operations and/or layer 4 operations may be included as well.

In the example shown in FIG. 3, the lookup stage 304 may include a lookup table 312. The lookup table 312 may include frame entries which store information regarding frames received by the switch 100. As discussed above with respect to FIG. 1, the lookup table 312 may store, for example, addresses such as MAC addresses of received frames, ports 102A, 102B, 102C, 102D, 104 via which the frames were received, and/or virtual identifiers or VLANs of the received frames.

Figures 4, 5, 6, 7, 8:
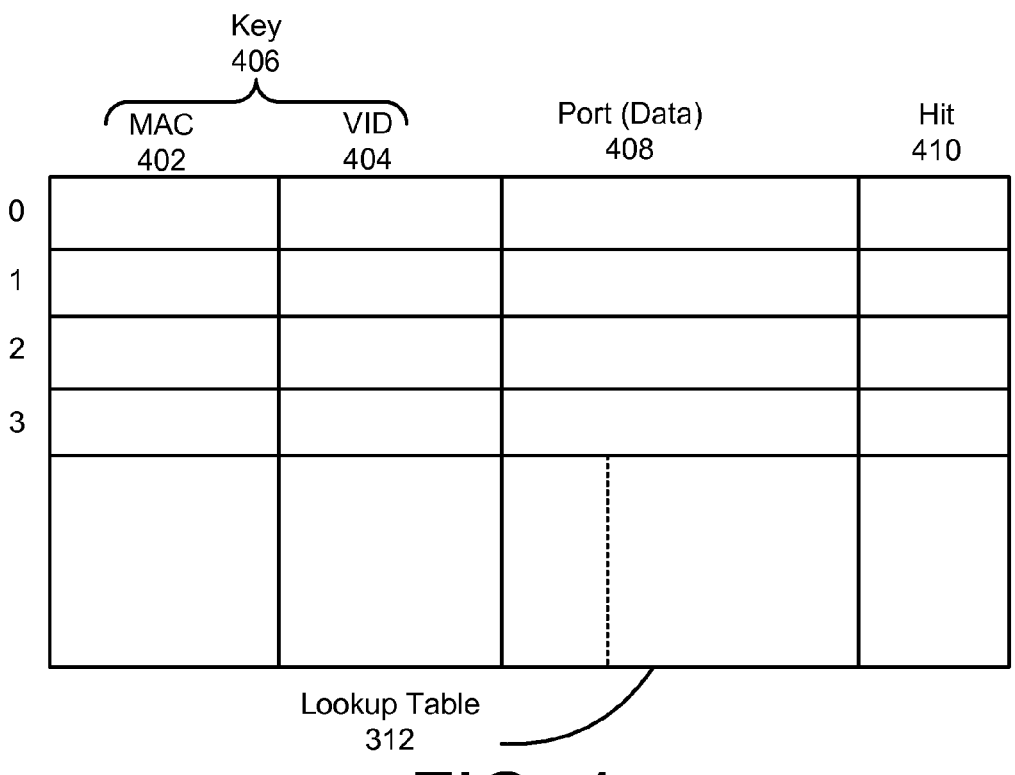
FIG. 4 is a diagram of a lookup table included in the ingress pipeline according to an example embodiment.
FIG. 5 is a block diagram of a match mask register included in the ingress pipeline according to an example embodiment.
FIG. 6 is a block diagram of a match data register included in the ingress pipeline according to an example embodiment.
FIG. 7 is a block diagram of a replace mask register included in the ingress pipeline according to an example embodiment.
FIG. 8 is a block diagram of a replace data register included in the ingress pipeline according to an example embodiment.

FIG. 4 is a diagram of the lookup table 312 included in the lookup state 304 of the ingress pipeline 108 according to an example embodiment. The lookup table 312 may include a plurality of frame entries. Frame entries 0-3 are shown in FIG. 4; however, the lookup table 312 may include many more frame entries than shown. The lookup table 312 may include at least 1000 unique frame entries and/or may include 128 k or 128,000 unique frame entries, according to example embodiments.

The frame entries may include a plurality of fields. In the example shown in FIG. 4, the frame entries may each include a MAC address 402. The MAC address 402 of the frame entries may indicate a source address of the received frames. The frame entries in the lookup table 312 may also include a virtual identifier 404. The virtual identifier 404 may indicate a virtual identifier or VLAN of the frames received by the switch 100. The MAC address 402 and VID 404 may collectively form a key 406 of the received frames. The key 406 may indicate a computing device from which the frame was received and a virtual network or virtual identifier of the received frames.

The frame entries in the lookup table 312 may also include a port field 408 or data field associated with the received frames. The port or data field 408 of the frame entries may indicate a port 102A, 102B, 102C, 102D, 104 via which the frame was received. The port field 408 may be associated and/or mapped to the MAC field 402. The ingress pipeline 108 may use the port field 408 associated with a given MAC field 402 to determine a port 102A, 102B, 102C, 102D, 104 via which to send a received frame. For example, the ingress pipeline and/or egress pipeline 112 may check a destination address 210 of a received frame 200, and search for that address in the MAC field 402 upon matching the destination address 210 to a frame entry with that destination address 210 in the MAC field 402; the ingress pipeline and/or egress pipeline 112 may check the port field 408 of the same frame entry. The egress pipeline 112 may send and/or forward or route the frame out of the port 102A, 102B, 102C, 102D, 104 indicated by the port field 408 of the frame entry with the MAC field 402 matching the destination address 210 of the received frame.

The lookup table 312 may also include a hit field 410. The lookup table 312 and/or lookup stage 304 may set the hit field 410 each time a frame with a source address matching the entry of a MAC field 402 is received. Thus, the hit field 410 may be set, such as to one (1), if the switch 100 has received a frame with the source address matching the address in the MAC field 402 within the preceding predetermined time interval. The hit field 410 of a given MAC address may not be set, and therefore may be subject to being erased, if the switch 100 has not received a frame with the source address 212 matching the address stored in the MAC field 402 according to an example embodiment.

Returning to FIG. 3, the lookup stage 304 may also include a match mask register 314 and match data register 316. The lookup stage 304 may perform a comparison on a given frame entry to the match register 314 and match data register 316 to determine whether the identified action should be performed on a given frame entry. In an example embodiment, the instruction decode stage 302 may send a match instruction with which the lookup stage 304 should fill the match mask register 314 and the match data register 316. The instruction decode stage 302 may have received the values for the match mask register 314 and the match data register 316 from the bulk instruction. The fields of the match mask register 314 and the match data register 316 may be the same for all of the frame entry instructions sent by the instruction decode stage 302 to the lookup stage 304 for a given bulk instruction.

FIG. 5 is a diagram of a match mask register 314 included in the ingress pipeline 108 according to an example embodiment. The fields of the match mask register 314 correspond to the fields of the frame entries in the lookup table 312 shown in FIG. 4 above. The bits of the match mask register 314 may indicate which bits of the match data register 316 the lookup stage 304 should compare the corresponding bits in the frame entry of the lookup table 312. In this example, the bits of the virtual identifier in the match mask register 314 are set to one, indicating that the lookup stage 304 should compare the bits of the virtual identifier field 404 of each frame entry in the lookup stage 312 to the bits of the virtual identifier field of the match data register 316, but the other fields, namely the MAC field, port field and hit field, are set to zero indicating that the lookup stage 304 need not compare these fields of the match data register 316 to the corresponding fields of the frame entry in the lookup table 312.

FIG. 6 is a diagram of the match data register 316 included in the ingress pipeline 108 according to an example embodiment. The fields of the match data register 316 correspond to the fields of the frame entries in the lookup table 312 shown in FIG. 4 above. In this example, the match data register 316 includes bits and/or data of the virtual identifier which should be compared to the corresponding bits of the virtual identifier field 312 of each frame entry in the lookup table 312. In an example embodiment, the lookup stage 304 will compare the bits and/or data of the virtual identifier field in the match data register 316 to the corresponding bits of the frame entry in the lookup table 312 identified by the match instruction.

The lookup stage 304 may also include a match register 318. The match register 318 may indicate whether the comparison of the data included in the match data register 316 to the data included in the corresponding field in the identified frame entry of the lookup table 312 was a match. The lookup stage 304 may use the match register 318 to determine whether to perform the action identified in the following action instruction on the identified frame entry in the lookup table 312. In the example shown in FIG. 3, the lookup stage 304 also includes a replace mask register 320 and a replace data register 322.

FIG. 7 is a diagram of a replace mask register 320 included in the ingress pipeline 108 according to an example embodiment. The fields of the replace mask register 320 correspond to the fields of the frame entries in the lookup table 312 shown in FIG. 4 above. The replace mask register 320 may indicate the fields of the identified frame entry in the lookup stage 312, upon which the lookup stage 304 should perform the identified action. In an example embodiment, if the bits in a field or any bits of the replace mask register are set to one (1), then the lookup stage 304 will perform the identified action on the identified frame entry in the lookup table 312. If the bits and/or field are not set to a given field or bits in the replace mask register 320, then the lookup stage 304 will perform no action on the corresponding fields of the identified frame entry in the lookup table 312.

FIG. 8 is a diagram of the replace data register 322 included in the ingress pipeline 108 according to an example embodiment. The fields of the replace data register 322 correspond to the fields of the frame entries in the lookup table 312 shown in FIG. 4 above. In this example, the bits and/or data in the field, upon which the replace mask register 320 identified that an action will be performed, shows the action to be performed. In this example, the replace data register 322 identifies the values and/or data to which the fields or bits of the corresponding frame entry of the lookup table 312 are to be set. In an example embodiment, the lookup stage 304 may set the fields of the identified frame entry in the lookup table 312 only if the match register 318 indicates that the match instruction resulted in a match.

The values of the replace mask register 320 and the replace data register 322 may be based on the action instruction and/or may be the same for all frame entry instructions which are based on a given bulk instruction. Thus, the lookup stage 304 may respond to receiving a match instruction identifying a frame entry in the lookup table 312 by performing a match operation on a given frame entry in the lookup table 312 by comparing the bits identified in the match mask register 314 with the identified bits and/or fields in the lookup table 312 with the identified bits in the match data register 316. The instruction decode stage 302 may send an action instruction to the lookup stage 304 after sending the match instruction to the lookup stage 304. The action instruction may include the fields of the replace mask register 320 and the replace data register 322. The lookup stage 304 may replace the fields in the identified frame entry of the lookup stage of the lookup table 312 which are identified in the replace mask register with the data and/or bits included in the replace data register 322, all according to an example embodiment.

Returning to FIG. 3, the lookup stage 304 may also include a table writer 324. The table writer 324 may perform the actions on the lookup table 312 described herein. The table writer 324 may replace, modify, and/or delete frame entries in the lookup table 312. The table writer 324 may replace, modify, and/or delete frame entries in the lookup table 312 based on the frame entry instructions received from the instruction decode stage 302. The table writer 324 may replace, modify, and/or delete frame entries in the lookup table 312 based on the replace mask register 320 and/or the replace data register 322, based on comparisons of the frame entries to the match mask register 314 and/or the match data register 316, and/or based on the match register 318, according to example embodiments.

Figure 9:
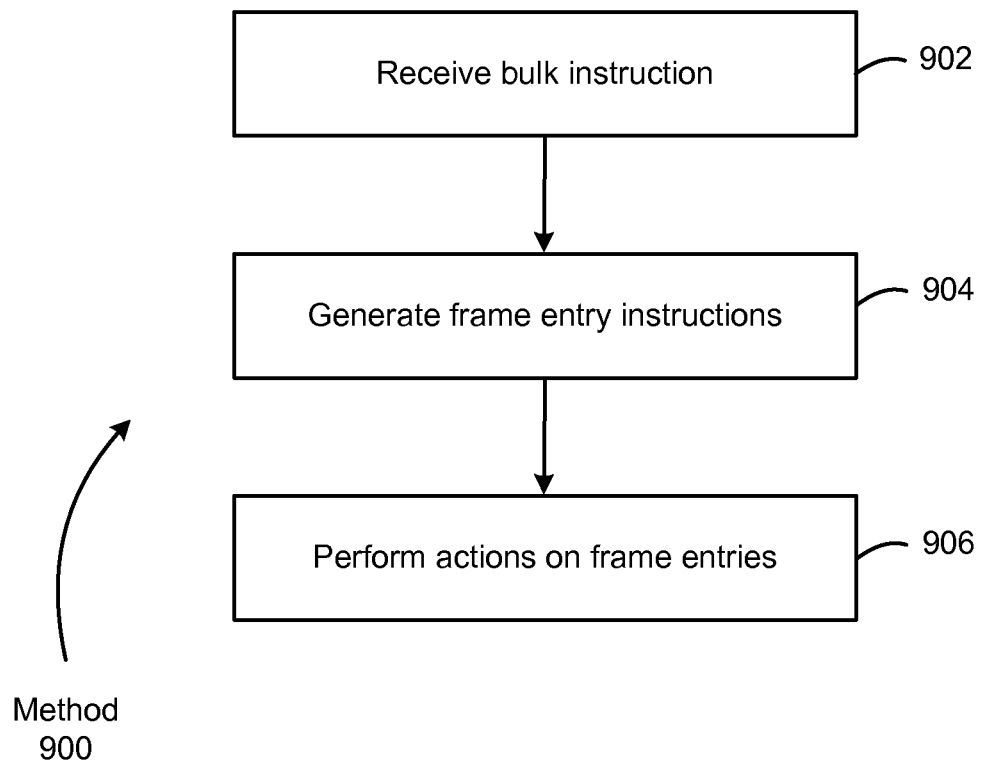
FIG. 9 is a flowchart of a method according to an example embodiment.

FIG. 9 is a flowchart of a method 900 according to an example embodiment. In an example embodiment, the method 900 may include receiving, by a network switch 100, a bulk instruction from a processor outside the network switch 100, the bulk instruction identifying an action to perform on frame entries (902). The method 900 may also include, in response to receiving the bulk instruction, generating a plurality of frame entry instructions, each of the frame entry instructions identifying the action and identifying a unique frame entry in the network switch 100 upon which to perform the action (904). The method 900 may also include, based on each of the generated frame entry instructions, performing the identified action on the frame entry identified by the respective frame entry instruction (906).

In an example embodiment, the generating the plurality of frame entry instructions (904) may include performing a loop function, the loop function may include a number of iterations based on a number of frame entries included in the network switch, each of the iterations may include generating one of the plurality of frame entry instructions, and each of the plurality of frame entry instructions may identify the action and identify one of the unique frame entries, the identified unique frame entry being based on a number of the iteration.

In an example embodiment, the bulk instruction may identify the action without identifying any of the frame entries upon which to perform the action.

In an example embodiment, the bulk instruction may identify the action to perform on frame entries of the lookup stage independently of identifying any of the frame entries. In this example, each of the frame entry instructions may identify the action and identify the unique frame entry in the lookup stage upon which to perform the action.

In an example embodiment, the bulk instruction may identify the action to perform on frame entries of the lookup stage independently of identifying any of the frame entries. In this example, each of the frame instructions may identify the action and identify the unique frame entry in the lookup stage upon which to perform the action. In this example, consecutive frame entry instructions may identify consecutive unique frame entries.

In an example embodiment, the bulk instruction may identify the action to perform on frame entries of the lookup stage independently of identifying any of the frame entries. In this example, the generating the frame entry instructions may include performing a loop function, a number of iterations in the loop function being based on a number of frame entries included in the network switch, each of the iterations including generating a frame entry instruction, each of the frame entry instructions identifying the action and identifying a unique frame entry upon which to perform the action, the identified unique frame entry being based on an iteration number of the iteration.

In an example embodiment, the generating may include generating N frame entry instructions, N being equal to a number of frame entries included in the network switch, each of the N frame entry instructions identifying the action and identifying one of the N unique frame entries in the network switch upon which to perform the action.

According to an example embodiment, the identified action may include a replace entry.

According to an example embodiment, the identified action may include a delete entry.

According to an example embodiment, the identified action may include age entry.

According to an example embodiment, the generating may include generating a match instruction followed by an action instruction for each one of the unique frame entries in the network switch. In this example, each of the match instructions and action instructions may identify one of the unique frame entries. Also in this example, each of the action instructions may instruct the network switch to perform an action on the identified unique frame entry if the identified unique frame entry matches criteria specified in the preceding match instruction.

In an example embodiment, the bulk instruction may identify the action to perform on frame entries, but independently of identifying any of the frame entries, and identify match bits against which to perform match comparisons for each of the frame entries. In this example, the generating may include generating at least a first match instruction identifying the first unique frame entry and identifying the match bits against which to perform a first match comparison for the first unique frame entry, a first action instruction identifying the first unique frame entry and identifying the action, a second match instruction identifying the second unique frame entry and identifying the match bits against which to perform a second match comparison for the second unique frame entry, and a second action instruction identifying the second unique frame entry and identifying the action. In this example, the performing the identified action may include, in response to the first match instruction, performing the first match comparison of the match bits against the first frame entry, in response to the first action instruction, performing the identified action on the first unique frame entry based on the first match comparison of the identified bits to the first unique frame entry resulting in a first match, in response to the second match instruction, performing the second match comparison of the match bits against the second frame entry, and in response to the second action instruction, performing the identified action on the second unique frame entry based on the second match comparison of the identified bits to second first unique frame entry resulting in a second match.

In an example embodiment, the network switch may comprise at least one thousand (1,000) unique frame entries.

In an example embodiment, the receiving the bulk instruction may include receiving the bulk instruction via a CPU management interface controller (CMIC) configured to receive a software bulk command from the processor outside the switch.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A switch comprising:
   an instruction decode stage configured to:
   receive a bulk instruction identifying an action to perform on frame entries of a lookup stage; and
   in response to receiving the bulk instruction, perform a loop function, the loop function including a number of iterations based on a number of frame entries included in the switch, each of the iterations including sending a frame entry instruction to the lookup stage, each of the frame entry instructions identifying the action and identifying a unique frame entry in the lookup stage upon which to perform the action, the identified unique frame entry being based on an iteration number of an iteration; and
   the lookup stage configured to:
   receive the frame entry instructions from the instruction decode stage; and in response to receiving each of the frame entry instructions, perform the identified action on the frame entry identified by the respective flame entry instruction.

2. The switch of claim 1, wherein the instruction decode stage is configured to:
receive the bulk instruction, the bulk instruction identifying the action to perform on frame entries of the lookup stage independently of identifying any of the frame entries; and
in response to receiving the bulk instruction, send, to the lookup stage, the frame entry instructions, each of the frame entry instructions identifying the action and identifying the unique frame entry in the lookup stage upon which to perform the action.

3. The switch of claim 1, wherein the instruction decode stage is configured to:
receive the bulk instruction, the bulk instruction identifying the action to perform on frame entries of the lookup stage independently of identifying any of the frame entries; and
in response to receiving the bulk instruction, send, to the lookup stage, the frame entry instructions, each of the frame entry instructions identifying the action and identifying the unique frame entry in the lookup stage upon which to perform the action,
wherein the instruction decode stage is configured to send the entry instructions consecutively, the consecutively sent frame entry instructions identifying consecutive unique frame entries.

4. The switch of claim 1, wherein the instruction decode stage is configured to receive the bulk instruction, the bulk instruction identifying the action to perform on frame entries of the lookup stage independently of identifying any of the frame entries.

5. The switch of claim 1, wherein the lookup stage comprises a lookup table configured to store the frame entries and a table writer configured to modify the frame entries in the lookup table based on the identified action.

6. The switch of claim 1, wherein the lookup stage comprises a layer 2 (L2) lookup table configured to store the frame entries and a table writer configured to write a medium access control identifier (MACID), a virtual identifier (VID), and a port identifier into one of the frame entries for each frame received by the switch.

7. The switch of claim 1, wherein:
the identified action includes replace entry; and
the lookup stage is configured to replace at least a portion of the identified frame entry in response to receiving each of the frame entry instructions.

8. The switch of claim 1, wherein:
the identified action includes delete entry; and
the lookup stage is configured to delete at least a portion of the identified frame entry in response to receiving each of the frame entry instructions.

9. The switch of claim 1, wherein:
the identified action includes age entry; and
the lookup stage is configured to age the identified frame entry in response to receiving each of the frame entry instructions.

10. The switch of claim 1, wherein:
the instruction decode stage is configured to send, to the lookup stage in response to receiving the bulk instruction, a match instruction followed by an action instruction for each one of the unique frame entries in the lookup stage,
each of the match instructions and action instructions identifies one of the unique frame entries, and
each of the action instructions instructs the lookup stage to perform an action on the identified unique frame entry if the identified unique frame entry matches criteria specified in a preceding match instruction.

11. The switch of claim 1, wherein the lookup stage comprises at least one thousand (1,000) unique frame entries.

12. The switch of claim 1, further comprising:
at least a first port and a second port, each of the first port and second port being configured to receive and transmit frames.

13. The switch of claim 1, further comprising a CPU management interface controller (CMIC) configured to receive a software bulk command from a device outside the switch and, in response to receiving the software bulk command, transmit the bulk command to the instruction decode stage.

14. The switch of claim 1, further comprising a CPU management interface controller (CMIC) configured to receive a software bulk command from a CPU outside the switch and, in response to receiving the software bulk command, transmit the bulk command to the instruction decode stage.

15. The switch of claim 1 further comprising:
at least a first port and a second port, each of the first port and second port being configured to receive and transmit frames;
an ingress pipeline comprising the instruction decode stage and the lookup stage, the ingress pipeline being configured to receive the bulk instruction, receive the frames from the first port and the second port, and transmit the frames to a memory management unit;
the memory management unit configured to receive, store, and transmit the frames to an egress pipeline;
the egress pipeline configured to receive the frames from the memory management unit and transmit the frames out of the switch via the first port or the second port; and
a CPU management interface controller (CMIC) configured to receive a software bulk command from a device outside the switch and, in response to receiving the software bulk command, transmit the bulk command to the ingress pipeline.

16. A method comprising:
receiving, by a network switch, a bulk instruction from a processor outside the network switch, the bulk instruction identifying an action to perform on frame entries;
in response to receiving the bulk instruction, performing a loop function, the loop function including a number of iterations based on a number of frame entries included in the network switch, each of the iterations including generating one of a number of frame entry instructions, each of the frame entry instructions identifying the action and identifying a unique frame entry in the network switch upon which to perform the action, the identified unique frame entry being based on the number of iterations; and
based on each of the generated frame entry instructions, performing the identified action on the frame entry identified by the respective frame entry instruction.

17. The method of claim 16, wherein the bulk instruction identifies the action without identifying any of the frame entries upon which to perform the action.

18. A non-transitory computer-readable storage medium comprising instructions stored thereon that, when executed by at least one processor, are configured to cause a computing system to at least:
receive, by an instruction decode stage, a bulk instruction identifying an action to perform on frame entries;
in response to receiving the bulk instruction, perform a loop function, the loop function including a number of iterations based on a number of frame entries included in the computing system, each of the iterations including generating one of a number of frame entry instructions and sending the generated frame entry instructions to a lookup stage, each of the frame entry instructions identifying the action and identifying a unique frame entry upon which to perform the action, the identified unique frame entry being based on the number of an iteration; and based on each of the generated frame entry instructions, perform the identified action, by the lookup stage, on the frame entry identified by the respective frame entry instruction.

19. The non-transitory computer-readable storage medium of claim 18, wherein the frame entry instructions include N frame entry instructions, N being an integer based on a number of frame entries, each of the N frame entry instructions identifying the action and identifying one of the N unique frame entries upon which to perform the action.

20. The switch of claim 1, wherein the instruction decode stage is configured to send, to the lookup stage in response to receiving the bulk instruction, N frame entry instructions, N being an integer based on a number of frame entries included in the lookup stage, each of the N frame entry instructions identifying the action and identifying one of the N unique frame entries in the lookup stage upon which to perform the action.

* * * * *